United States Patent
Link, II et al.

(10) Patent No.: US 7,603,118 B1
(45) Date of Patent: Oct. 13, 2009

(54) SYSTEM AND METHOD FOR PROVIDING USSD-LIKE FEATURES IN A WIRELESS NETWORK

(75) Inventors: Charles M. Link, II, Atlanta, GA (US); Max G. Faulkner, Roswell, GA (US); Donald M. Cardina, Lawrenceville, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 11/099,150

(22) Filed: Apr. 4, 2005

Related U.S. Application Data

(60) Provisional application No. 60/566,494, filed on Apr. 28, 2004.

(51) Int. Cl.
*H04Q 7/20* (2006.01)
(52) U.S. Cl. .............. 455/432.2; 455/414.2; 455/433; 455/428
(58) Field of Classification Search ...... 455/410–414.1, 455/415, 432.2, 433; 379/76, 88.19, 111–113
See application file for complete search history.

(56) References Cited

U.S. PATENT DOCUMENTS

| | | | |
|---|---|---|---|
| 6,370,241 B1* | 4/2002 | Clark | 379/144.01 |
| 6,480,717 B1* | 11/2002 | Ramaswamy | 455/445 |
| 6,580,904 B2* | 6/2003 | Cox et al. | 455/456.2 |
| 2002/0163938 A1* | 11/2002 | Tuomainen et al. | 370/468 |
| 2003/0216145 A1* | 11/2003 | Cox et al. | 455/456.1 |
| 2004/0218734 A1* | 11/2004 | Gilbert et al. | 379/76 |
| 2005/0101306 A1* | 5/2005 | Zabawskyj et al. | 455/414.1 |
| 2005/0108156 A1* | 5/2005 | Sumino et al. | 705/40 |
| 2005/0272438 A1* | 12/2005 | Holur et al. | 455/452.2 |

* cited by examiner

*Primary Examiner*—Patrick N. Edouard
*Assistant Examiner*—Dai A Phuong
(74) *Attorney, Agent, or Firm*—Parks IP Law LLC; Jonathan A. Paulis

(57) ABSTRACT

A system for providing USSD-like features in a wireless network is provided. Furthermore, the system provides for an automated customer service response in a wireless network. The system comprises a mobile switching center configured to analyze a digit string received from a mobile device. In some embodiments, an analysis and translation module converts the digit string into a service request. The service request is sent to a trigger platform which generates and forwards an immediate connection termination response to release the connection. The trigger platform further initiates a customer service response process to obtain the information indicated by the service request. The customer service response containing the service requested information may be validated prior to a short message service center formatting and forwarding the customer service response to the requesting mobile device.

16 Claims, 4 Drawing Sheets

SYSTEM AND METHOD FOR PROVIDING USSD-LIKE FEATURES IN A WIRELESS NETWORK

CROSS-REFERENCE TO RELATED APPLICATION

The present application claims the priority and benefit of U.S. Provisional Patent Application No. 60/566,494 entitled "System and Method for Providing USSD Features in TDMA, IS-41 and CDMA Networks" filed Apr. 28, 2004, which is hereby incorporated by reference.

BACKGROUND OF THE INVENTION

1. Field of the Invention

The present invention relates generally to mobile devices, and more particularly to providing Unstructured Supplementary Service Data (USSD)-like features in a wireless network.

2. Description of Related Art

Typically, a cellular phone customer is constrained by the number of airtime minutes he or she subscribes to each month. This bucket of minutes will be used for various purposes such as making outgoing calls, receiving incoming calls, and accessing customer service features via their cellular phone. Although, the customer may exceed their bucket of minutes provided by their service plan, the cost per minute in excess of the minutes provided by the service plan is usually quite high. Therefore, customers prefer to keep usage within their bucket of minutes.

On occasion, the customer may need to access customer service features via their cellular phone. For example, the customer may want to check the number of minutes used and remaining in their service plan for the month, determine if their last payment was received, or retrieve a voicemail password. In some instances, obtaining this information requires the customer to call customer service and talk to a live operator. Disadvantageously, this call to customer service will deplete the number of available minutes on the service plan, and may take several minutes to complete. A further disadvantage, from the service providers prospective, is that the service provider must employ a sufficient amount of customer service representatives to handle all the customer service calls. Alternatively, if there are not enough customer service representatives, the customer may be forced to hold for a long period of time. This hold time will further deplete the number of available airtime minutes from the service plan, and may cause the customer to be unsatisfied by the experience.

A possible solution is to automate some of the customer service calls. Thus, the customer may call into customer service and navigate through numerous audio menus to reach the service they desire. Alternatively, the customer may be required to scroll and navigate through numerous graphical menus on their cellular phones display. In both situations, the minutes from the service plan are being used once the customer initiates the customer service call.

Therefore, there is a need for a system and method for providing automated customer service features which eliminate the use of a large amount of airtime minutes. There is a further need to provide USSD-like features in a wireless network.

SUMMARY OF THE INVENTION

The present invention provides exemplary systems and method for providing USSD-like features in a non-GSM wireless network. The exemplary system and method further functions to generate and return an automated customer service response in a wireless network. The system comprises a mobile switching center configured to analyze a digit string received from a mobile device. In some embodiments, an analysis and translation module converts the digit string into a service request. The service request is then sent to a trigger platform which generates and forwards an immediate connection termination response to the mobile switching center. Upon receipt of the connection termination response, the mobile switching center disconnects the mobile device. As a result, little or no airtime is used.

Substantially simultaneously with the generation of the connection termination response, the trigger platform initiates a customer service response process to obtain the information requested by the service request. In one example of the system, the trigger platform receives the requested information and generates necessary messaging to send a short message response directly to the requesting mobile device. In alternative embodiments, the trigger platform may extract required information from the service request and forward a query message containing the extracted information to a server or server farm. The server will then query a customer database for the requested information.

A customer service response containing the requested information is generated and validated by the messaging application router/open messaging gateway (MAR/OMG). The MAR/OMG may further verify customer preferences (e.g., language) for receipt of the customer service response. In exemplary embodiments, the customer service response is then sent to a short message service center (SMSC). The SMSC may convert the customer service response into a proper format based the communication type of the mobile device. For example, if the mobile device operates on a TDMA or CDMA environment, the customer service response may be formatted into an IS-41C SMS Delivery Point to Point (SMSDPP) message. The properly formatted message is then forwarded back to the requesting mobile device.

DESCRIPTION OF EXEMPLARY EMBODIMENTS

The present invention provides a system and method for providing USSD-like features in a non-GSM network, and further provides an automated customer service features in a wireless network. Specifically, a mobile device user may enter a special digit string, which the system will interpret to be a request for a particular type of customer service. Almost simultaneously with the receipt of the digit string, the connection between the system and the mobile device is terminated, thus eliminating or minimizing airtime usage. Once the system acquires the requested customer service information, a customer service response is sent back to the mobile device.

In exemplary embodiments, the special digit string is shorter than a typically phone number and corresponds to the requested information. In the present invention, the special (coded) digit string may start with "*" and end with a "#" sign, to resemble a similar USSD request on GSM. Thus for example, a user may obtain the number of minutes available and used under their plan by entering "*MIN#" (i.e., "*646#") and sending this coded digit string. Similarly, the user may check a balance on their plan by entering "*BAL#" or obtain a voicemail password by entering "*MAIL#". Further embodiments contemplate additional customer service coded digit strings. In an alternative embodiment, the coded digit string does not need to start with a "*" and/or end with a "#" sign, but may utilize other symbols or combination of symbols.

In a GSM environment, unstructured supplementary service data (USSD) is utilized to allow transmission of information. The special digit string is recognized as a USSD code and is processed accordingly. It is desirable to support USSD-like technology in non-GSM networks such as TDMA or CDMA networks where USSD is not supported nor are any other functions available for supporting a similar function. TDMA refers generally to a class of technologies including IS-54 and IS-136 where the SS7 networked transport is principally TIA-41/IS-41. CDMA refers generally to a class of technologies including CDMA2000, IS-95, and IS-2000 where an SS7 network (to be discussed infra) transport is principally TIA-41/IS-41. Therefore, in exemplary embodiments, the USSD-like technology may be enabled via the use of IS-41/SS7 communication language.

Figure 1:
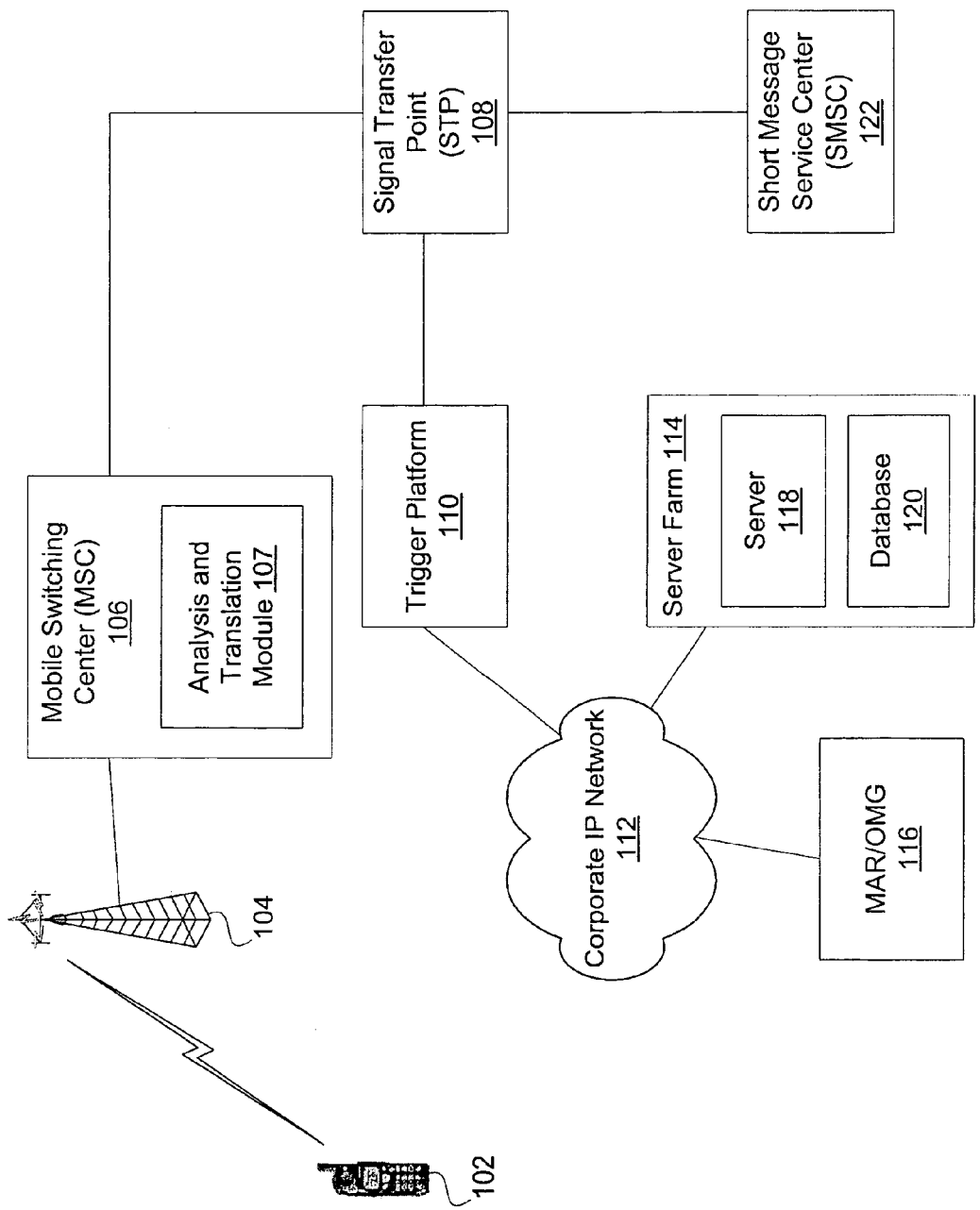
FIG. 1 is an exemplary TDMA environment in which the present invention may be practiced.

Referring to FIG. 1, an exemplary TDMA environment in which the present invention may be practiced is provided. The present invention may further be practiced on a similar CDMA environment. In this environment, a digit string is sent by a user from a mobile device 102 to a cell site 104 which relays the digit string to a mobile switching center (MSC) 106. In exemplary embodiments, the mobile device 102 is a cellular phone, however, the mobile device 102 may be any device capable of requesting customer service information.

The exemplary MSC 106 is configured with a number analysis and translation module 107 configured for analyzing the digit string. Once a coded digit string is received, the MSC 106 uses the number analysis and translation module 107 and a table to analyze this coded dialed digit string and translates this coded digit string to another functionality (e.g., to a long digit string, an "800" number, etc.). Advantageously, the user only needs to dial a short coded digit string to access some functionality instead of a seven, eight, eleven, or any other number digit number resulting in simplicity, speed of dialing, and less likelihood of dialing errors.

In exemplary embodiments, the coded digital string may comprise "*" "#" combination. For example, if the user dials "*646#," the number analysis and translations module 107 will analyze the digit string and translate the digit string. According to an exemplary embodiment, the digit string will be translated into a service request (e.g., to access and send cell usage minute information to the requesting mobile device 102). A response may then be generated based on the service request and sent to the user's mobile device 102. In further embodiments, this digital translation function may evaluate the digit strings and further parse, delete, add, or replace digits in the dialed digit string before passing the call onward. In an alternative embodiment, the number analysis and translation module 107 will translate the coded digit string into a seven digit number (e.g., phone number), ten digit numbers (e.g., area code and phone number), or any other number of digit numbers for contact with, for example, a customer service representative. Subsequently, the user may either converse with the customer service representative or the customer service representative may trigger a service request and immediately terminate the call.

The MSC 106 is also capable of applying special treatment to digit strings such as, for example, applying an IS-41C call treatment origination request. The origination request is used to validate mobile outbound calls and contains many elements of useful information such as a mobile directory number, serving system (needed to route results back to the requesting mobile device 102), a network's identification of the mobile device 102, serving cell ID, and electronic serial number (ESN).

After analysis, the service request is sent to a signal transfer point (STP) 108. In exemplary embodiments, the system runs on a SS7 (signaling system number 7) telecommunication standard. As a result, the STP 108 will comprise a SS7 router. The STP 108 forwards the service request to a trigger platform or node 110 which is configured to extract required information from the service request. The trigger platform 110 may formulate an immediate response to the service request by generating necessary messaging to send a short message response directly to the requesting mobile device 102. Alternatively, the trigger platform 110 forwards the service request (in the form of a query message) on to a proper network element for a response. In the present embodiment, the trigger platform 110 forwards a query message to a corporate IP network 112 coupled to a server farm 114 and a messaging application router/open messaging gateway (MAR/OMG) 116. The exemplary trigger platform 110 also sends an SS7 message and a connection termination response to cause the call treatment to terminate the connection with the mobile device 102, thus limiting use of airtime minutes. Once terminated, the mobile device 102 will return to a normal idle condition and await a response message.

The server farm 114, in exemplary systems, comprises at least one server 118 and at least one database 120 of customer and customer service information which can be queried by the server 118 to find the requested customer service information. In one exemplary embodiment, the at least one server 118 is a Unix server. The requested customer service information may then be assembled into a customer service response. In exemplary embodiments, the customer service response is in a form of a short messaging service (SMS), a text message service that enables short messages of generally no more than 140-160 characters in length to be sent and transmitted from the mobile device 102. Subsequently, the MAR/OMG 116 validates the customer service response and checks permissions of the user prior to forwarding the response message to a short message service center (SMSC) 122. Because the environment is a TDMA environment, the customer service response is, in exemplary embodiments, sent via short message peer-to-peer (SMDPP) to the SMSC 112. It should be noted that any type of server may be utilized in connection with the present invention. For example, a specific server which is much simpler and faster may immediately perform the CAS IP transaction and forward the response to either the SMSC 112 or generate the IS-41C SMDPP message.

The exemplary SMSC 112 is an access point for the customer service response. In the present embodiment, the SMSC 122 receives the customer service response from the MAR/OMG 116 and reformats the customer service response for delivery to the mobile device 102. For example. The SMSC 122 may reformat the response into an IS-41C SMDPP message. The customer service response is then forwarded to the user (i.e., mobile device 102) via the STP 108 and the MSC 106.

It should be noted that the environment of FIG. 1 is exemplary and other standards and elements may be utilized. For example, the system may run on a telecommunication standard other than SS7, and may comprise more, less, or other similar elements. Further, the SMSC 122 may be optional (and the return message can be formatted by the trigger platform 110) or may convert the customer service response into other types of formats.

Figure 2:
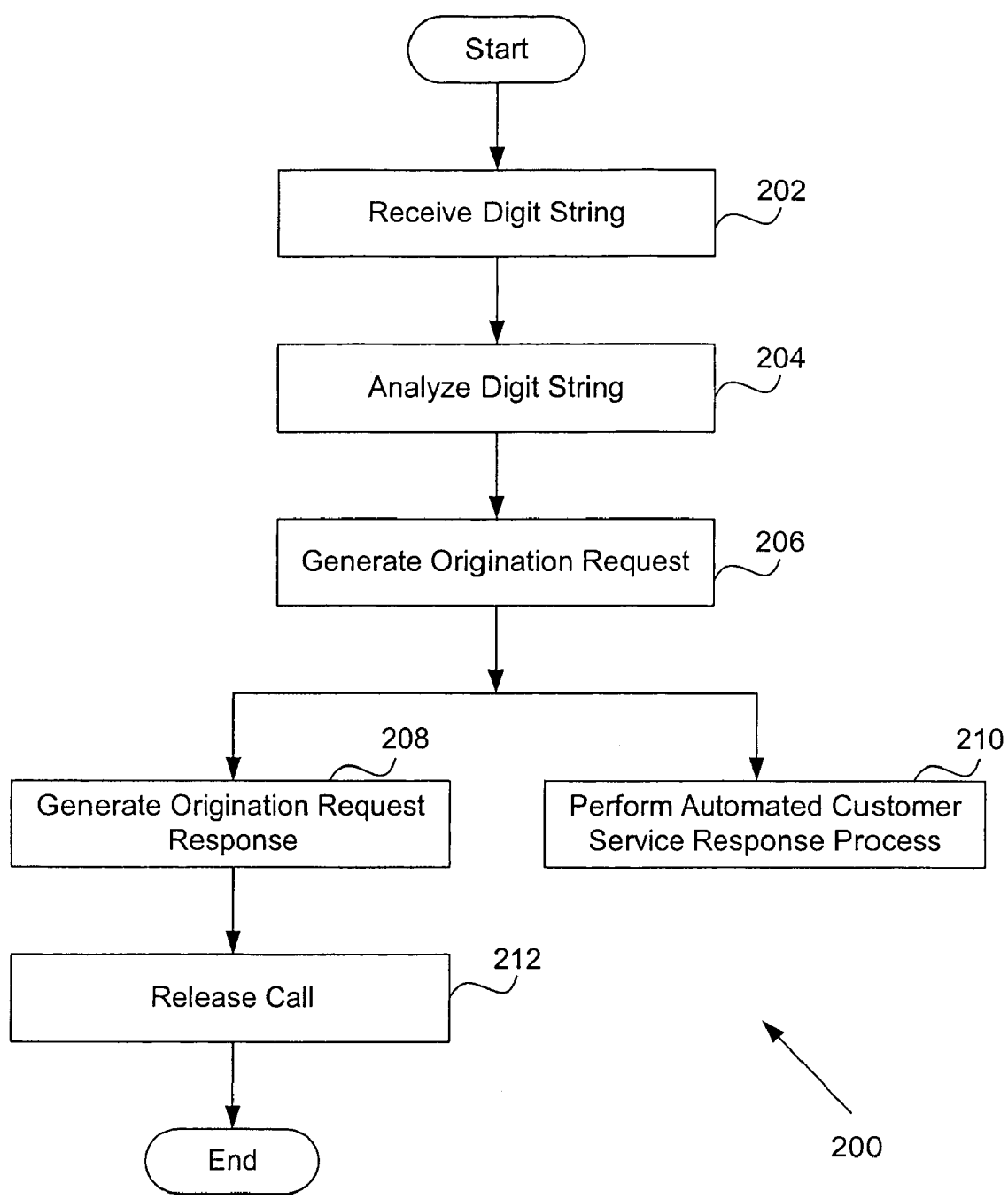
FIG. 2 is flowchart of a method for providing automated customer services in the TDMA embodiment of FIG. 1.

FIG. 2 is a flowchart 200 of a method for providing automated customer services (e.g., the customer service response) in the TDMA/CDMA embodiment of FIG. 1. Initially, a user will enter a special (coded) digit string on their mobile device 102 (FIG. 1). As an example for this discussion, the coded digit string is "*646#." The mobile device 102 will initiate a call request to the TDMA network exactly as if the call request is a voice call. In step 202, the TDMA cell site 104 (FIG. 1) receives the call request and forwards the request to the associated TDMA MSC 106 (FIG. 1).

The MSC 106 analyzes and processes the special digit string in step 204. As with all call attempts, the MSC 106 examines the digit string. If the MSC 106 recognizes the digit string as a unique code (e.g., special digit string), the number analysis and translation module 107 of the MSC 106 analyzes this dialed digit string and translates the unique code to another functionality. In the present example, the digit string "*646#" is recognized as a unique code and special treatment is applied. This special treatment is an IS-41C call treatment origination request. Thus, the MSC 106 generates an SS7 origination request message containing useful extracted information including mobile directory number, serving system (needed to route results back to the requesting mobile device 102), a network's identification of the mobile device 102, serving cell ID, and electronic serial number (ESN) in step 206.

The origination request (i.e., service request) is sent to the trigger platform 110 (FIG. 1) which extracts the information required to generate a response. The trigger platform 110 either formulates an immediate response to the origination request or forwards the request on to further network elements for a response. In exemplary embodiments, the trigger platform 110 responds with an origination request response message, such as an SS7 origination request response message, that contains a connection termination message in step 208. Optionally, the trigger platform 110 may also generate an SMDPP message indicating receipt of the request. For example the message may read "Thank you. Your request is being processed. A message will be sent to your phone shortly." The message(s) is routed back to the STP 108 (FIG. 1) and forwarded to the originating MSC 106.

When the trigger platform 110 responses to the MSC 106, the trigger platform 110 also initiates a process to provide the customer service response (e.g., for *646#, number of minutes used and remaining in monthly plan) in step 210. The steps for generating the origination request response and starting the customer service response process may occur in parallel or either of the steps may precede the other. The customer service response process is discussed in more detail below in connection with FIG. 3.

The MSC 106 receives the origination request response from the trigger platform 110 and terminates the connection with the mobile device 102 in step 212. In further embodiments, the MSC 106 may also allocate a voice channel at the cell site 104 (FIG. 1) to the call request. Within milliseconds, the MSC 106 terminates the connection, and the mobile device 102 does not occupy (or has limited occupation of) the voice channel. Upon call termination, the mobile device 102 returns to an idle state. Accordingly, no or little airtime minutes are used.

Figure 3:
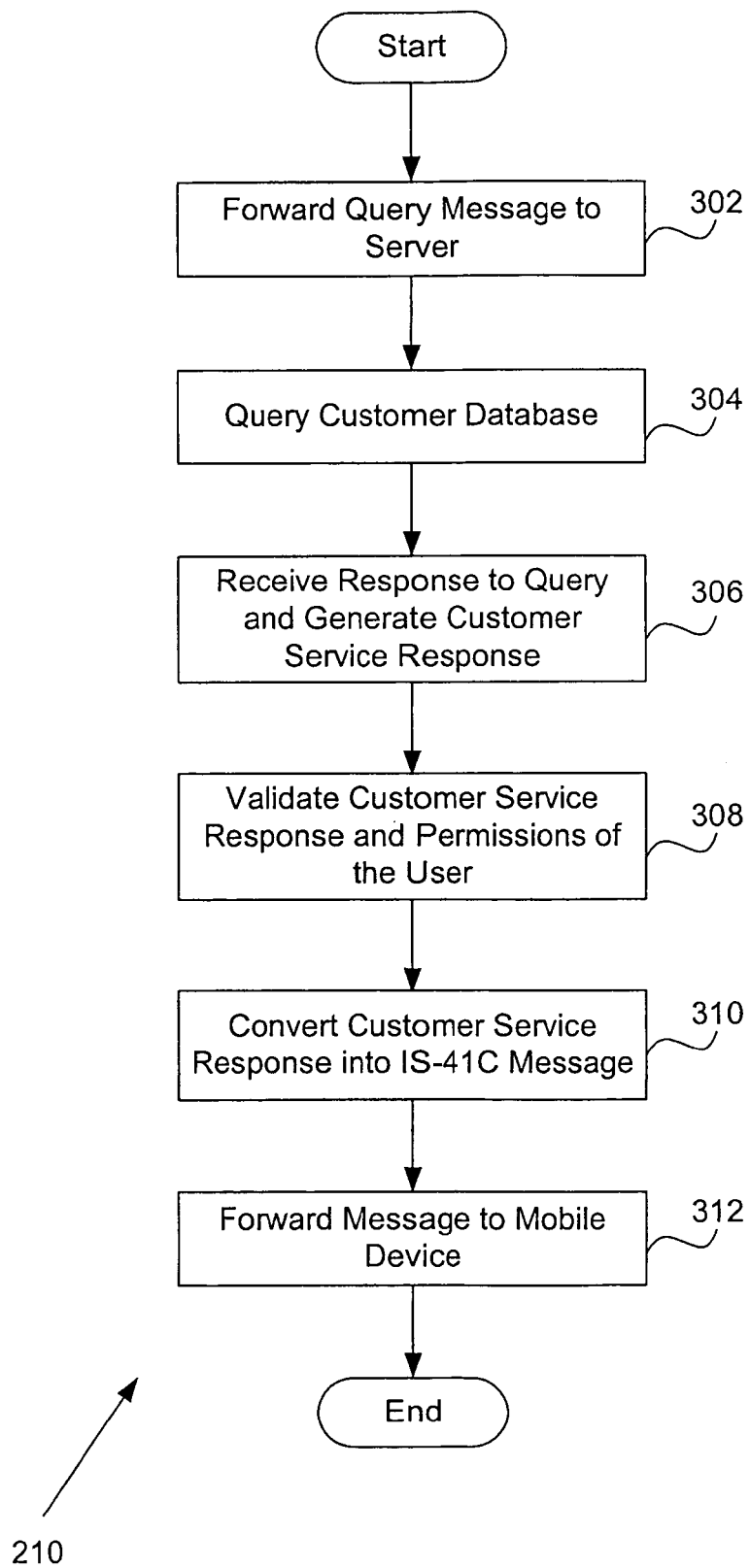
FIG. 3 is flowchart of an exemplary method for generating a service request response for a TDMA mobile device.

Referring now to FIG. 3, an exemplary method for performing the customer service response process (step 210) is shown. In step 302, the trigger platform 110 (FIG. 1) forwards a query message to the server 118 or server farm 114 (FIG. 1). In exemplary embodiments, the server 118 is a Unix server, and/or the query message is an IP message routed through a LAN or WAN. The query message may contain mobile directory number, serving system (needed to route results back to the requesting mobile device 102 of FIG. 1), a network's identification of the mobile device 102, serving cell ID, and electronic serial number (ESN). The query message may further include a function code indicating the dialed digit request (i.e., unique code). In the present example, the function code indicates the dialed digit request is "*646". Alternatively, the query message may forward the entire dialed or translated digit string.

The server 118 receives the query message from the trigger platform 110 via a secure (IP) link. The query message instructs the server 118 to query the customer database 120 (FIG. 1) in step 304. According to one embodiment, the query is performed via an application interface into a billing system of a wireless carrier, for example.

A response to the query is received by the server 118 and a customer service response is generated in step 306. In exemplary embodiments, the customer service response is a SMS message. Alternative embodiments may comprise other message formats. In some embodiments, the customer service response is then forwarded via short message peer-to-peer (SMDPP) back over the secure links through the corporate IP network 112 (FIG. 1).

The MAR/OMG 116 (FIG. 1) receives and validates the customer service response, and checks permissions of the customer for delivery of the customer service response in step 308. In some cases, the MAR/OMG may indicate a language preference or other customer specific preferences for the response.

Once validated, the customer service response is forward to the requesting mobile device 102 in step 312. In exemplary embodiments, the validated customer service response is sent to a high-speed short message service center (SMSC) 122 (FIG. 1) associated with the requesting mobile device 102 for transmission to the mobile device 102. The use of the high-speed SMSC 122 eliminates long delays normally associated with the SMSC store and forward operation. In some embodiments, the SMSC 122 associated with the mobile device 102 converts the customer service response received from the MAR/OMG 116 into a properly formatted IS-41C SMDPP message (optional step 310). Alternative embodiments may utilize other message formats. The customer service response may further comprise mobile device number and serving MSC point code. Using this information, the SMSC 122 will forward the customer service response directly to the mobile device 102 through the network (e.g., SS7 network) via the STP 108, the MSC 106, and the cell site 104.

In exemplary embodiments, the customer service response appears on the mobile device 102 like a normal SMS message. Thus, the user will receive an alerting tone that a message is available, and may access the message through normal operations (e.g., pushing a single button to read the requested response). In some embodiments, the requested response is delivered to the mobile device 102 within 10 seconds of the initial request. The amount of time for delivery of the requested response, however, is dependent on lookup time of the database 120 and any delays encountered in the SMSC 122, and may vary accordingly.

Figure 4:
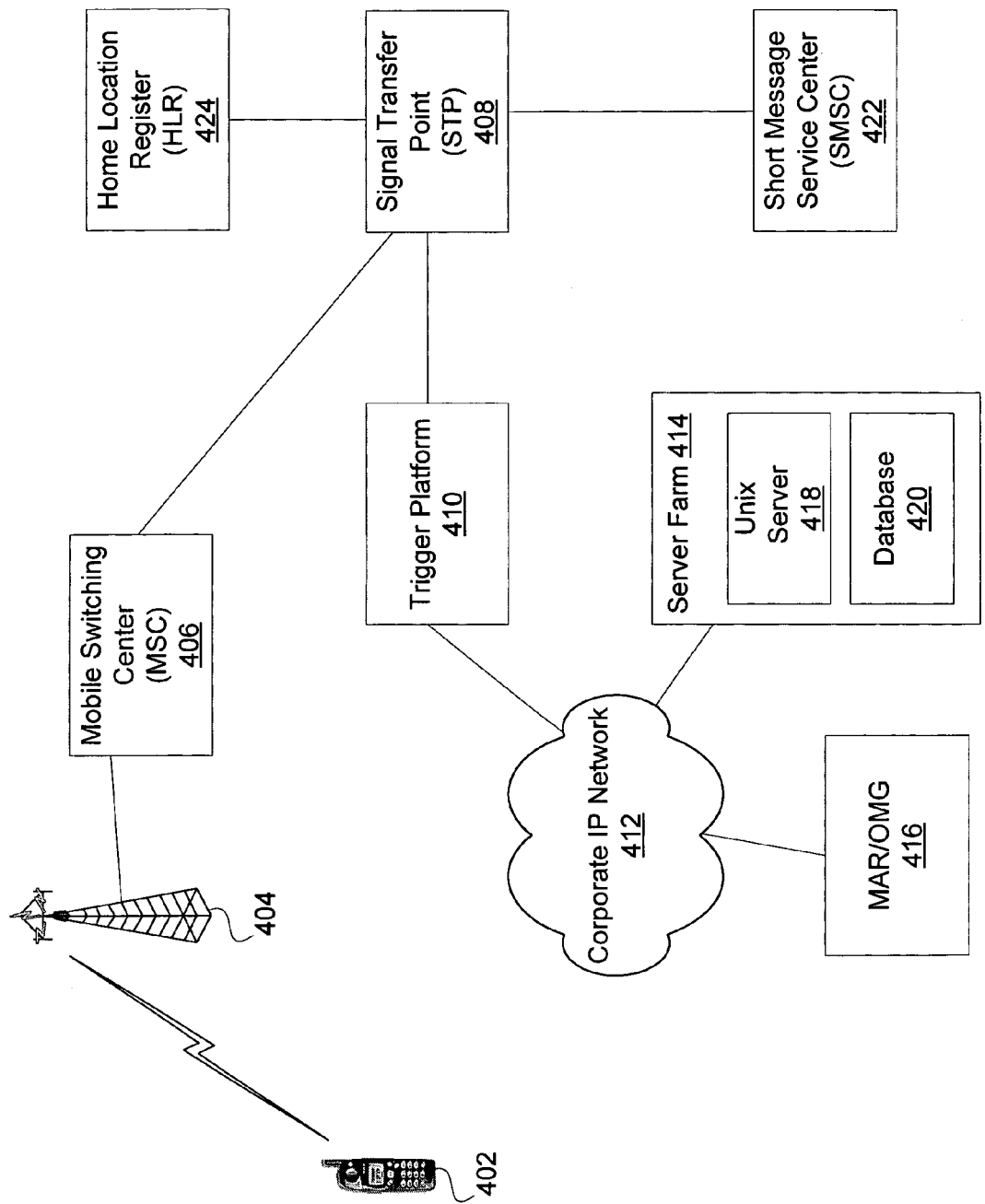
FIG. 4 is an exemplary GSM environment in which automated customer service response may be provided.

Referring now to FIG. 4, a GSM environment in which automated customer service responses may be provided is shown. In this environment, a digit string is sent by a user from a mobile device 402 to a cell site 404 which relays the digit string to a mobile switching center (MSC) 406. Because the GSM standard incorporate the use of USSD, translation by the MSC 406 is not required. Additionally, a response may be sent to the mobile device 402 using USSD.

After analysis by the MSC 406, a service request containing the digit string information is sent to a signal transfer point (STP) 408. In exemplary embodiments, the system runs on a SS7 (signaling system number 7) telecommunication standard. As a result, the STP 408 will comprise a SS7 router. The STP 108 forwards the service request to a trigger platform or node 410 which is configured to extract required information from the service request and either formulate an immediate response to the service request or forward the service request on to a proper network element for generating a response. In the present embodiment, the trigger platform 410 forwards a query to a corporate IP network 412 coupled to a server farm 414 and a MAR/OMG 416. The exemplary trigger platform 410 also sends a connection termination response to cause the MSC 406 to terminate the connection with the mobile device 402, thus limiting use of airtime minutes. Once terminated, the mobile device 402 will return to a normal idle condition and await a response message.

The server farm 414, in exemplary embodiments, comprises at least one server 418 and at least one database 420 of customer and customer service information which can be queried by the server 418 to find the requested customer service information. In exemplary embodiments, the server 418 is a Unix server. The requested customer service information may then be assembled into a customer service response. Subsequently, the MAR/OMG 416 validates the customer service response and checks permissions of the user prior to forwarding the customer service response to a short message service center (SMSC) 422.

The exemplary SMSC 422 is an access point for the customer service response. In the present embodiment, the SMSC 422 receives the customer service response from the MAR/OMG 416 and reformats the message, if necessary, for delivery to the mobile device 402. Thus, the SMSC 422 will reformat the customer service response to a communication type (e.g., GSM MAP) recognized by the GSM mobile device 402. The customer service response is then forwarded to the user (i.e., mobile device 402) via the STP 408 and the MSC 406.

The components of the GSM environment are similar to those of the TDMA environment. The GSM environment further comprises a home location register (HLR) 424 which is a database that manages mobile subscribers (i.e., the users). TDMA and CDMA may also include a home location register 424. The exemplary home location register 424 contains all subscription data such as locations of each mobile device 402, service plan, user preferences, and so forth. This information is vital in order to transmit and receive communications with the mobile device 402, and allows services to work in a similar way when the user is roaming outside of his home network.

Following GSM standards, a unique code for USSD mobile originated requests may range from, for example, "*100#" to "*149#". Alternatively, a simple menu may be downloaded onto the mobile device 102 from which a user may select the desired information. In yet a further embodiment, USSD requests may be enabled using any of ten codes "70" to "79" reserved for home pubic land mobile network (HPLMN) use. Other forms of unique codes may also be used in a GSM environment.

It should be noted that the GSM environment of FIG. 4 is exemplary. Alternative embodiments may comprise more, less, or other elements. For example, the server farm 414 may be replaced with a single server. Alternatively, the SMSC 422 may be optional and the return message can be formatted by the trigger platform 410.

In further embodiments of the automated customer service response system, enhanced automated customer services may be developed based on an "access code+optional parameter" concept. For example, a user may enter "*111#" on their mobile device 102 as an initial request. Once received, the response may indicate availability (e.g., via SMS or USSD messaging) of other options such as "*122#" for checking how many minutes are available, "*133#" for checking account balance, and so forth.

In an alternative embodiment of the automated customer service response system, additional parameter functionality may be utilized. USSD (in GSM), SMS, or simulated-USSD (in TDMA/CDMA) may implement additional parameters by separating the parameters with a "*", and terminating the request with a "#". An example of a feature utilizing this parameter function is a service that allows the user to select an alternative greeting for his voicemail for a variable number of days. Assuming the function code for using the alternative greeting is "*121#", the use of the alternative greeting for 11 days may be coded as "*121*11#".

The present invention is described above with reference to exemplary embodiments. It will be apparent to those skilled in the art that various modifications may be made and other embodiments can be used without departing from the broader scope of the present invention. Therefore, these and other variations upon the exemplary embodiments are intended to be covered by the present invention.

What is claimed is:

1. A system for providing Unstructured Supplementary Service Data (USSD) features in a wireless network wherein the wireless network does not support USSD, the system comprising:
   a mobile switching center (MSC) comprising an analysis and translation module, the MSC being configured to:
      analyze, via the analysis and translation module, a digit string received from a mobile device in a call;
      translate, via the analysis and translation module, the digit string into a service request; and
      send the service request to an SS7 signal transfer point (STP) for routing to a trigger platform;
   the trigger platform, in communication with the MSC, configured to:
      receive the service request from the STP;
      generate an immediate connection termination response to cause the call to be terminated thereby limiting minute use associated with the mobile device;
      send the immediate connection termination response to the MSC instructing the MSC to terminate the call so as to allow the mobile device to return to a normal idle condition and await a service request response; and
      initiate a service request response process based upon the service request derived from the digit string to provide a service associated with the service request.

2. The system of claim 1, wherein the MSC is configured to translate, via the analysis and translation module, the digit string into the service request, wherein the service request is a customer service phone number.

3. The system of claim 1 further comprising a server and a customer database, wherein the trigger platform is further configured to:
- generate and send a query message to the server, the query message being used to instruct the server to query the customer database for information regarding the requested service; and
- receive the service request response comprising the information regarding the requested service.

4. The system of claim 3 further comprising a message application router/open message gateway (MAR/OMG) configured to:
- validate the service request response; and
- forward the validated service request response to a message center for delivery to the mobile device.

5. The system of claim 4, wherein the message center is a short message service center (SMSC) configured to format and forward the service request response to the mobile device.

6. The system of claim 5, wherein the SMSC formats the service request response into an SMS message.

7. A method for providing Unstructured Supplementary Service Data (USSD) features in a wireless network wherein the wireless network does not support USSD, the method comprising:
- receiving, at a mobile switching center (MSC) comprising an analysis and translation module, a digit string in a call;
- the MSC analyzing, via the analysis and translation module, the digit string;
- the MSC translating, via the analysis and translation module, the digit string into a service request;
- the MSC sending the service request to an SS7 signal transfer point (STP) for routing the service request to a trigger platform;
- the trigger platform receiving the service request from the STP;
- the trigger platform generating an immediate connection termination response to cause the call to be terminated thereby limiting minute use associated with the mobile device;
- the trigger platform sending the immediate connection termination response to the MSC, instructing the MSC to terminate the call so as to allow the mobile device to return to a normal idle condition and await a service request response;
- the MSC terminating a connection with the mobile device in response to receiving the immediate termination response; and
- the trigger platform performing a service request response process based upon the service request derived from the digit string to provide a service associated with the service request.

8. The method of claim 7, wherein translating the digit string into the service request comprises translating the digit string into a customer service phone number.

9. The method of claim 7, wherein performing the service request response process comprises the trigger platform generating and sending a query message to a server to instruct the server to query a customer database for information regarding the requested service; and
- the trigger platform receiving the service request response comprising the information regarding the requested service.

10. The method of claim 9, wherein performing the request response process further comprises a message application router/open message gateway (MAR/OMG) validating the service request response and forwarding the validated service request response to a message center for delivery to the mobile device.

11. The method of claim 10, wherein performing the service request response process further comprises the MAR/OMG checking customer preferences for delivery of the service request response.

12. The method of claim 10, wherein forwarding the validated service request response to the message center for delivery to the mobile device comprises forwarding the validated service request response to a short message service center (SMSC) configured to format the service request response into an SMS message.

13. A computer readable medium encoded with instructions capable of being executed by a system to perform a method for providing Unstructured Supplementary Service Data (USSD) features in a wireless network wherein the wireless network does not support USSD, the method comprising:
- analyzing, via an analysis and translation module of the system, a digit string received in a call from a mobile device;
- translating, via the analysis and translation module, the digit string into a service request;
- generating an immediate connection termination response to cause the call to be terminated thereby limiting minute use associated with the mobile device;
- terminating the call so as to allow the mobile device to return to a normal idle condition and await a service request response; and
- performing a service request response process based upon the service request derived from the digit string to provide a service associated with the service request.

14. The computer readable medium of claim 13, wherein translating the digit string comprises translating the digit string into a customer service phone number.

15. The computer readable medium of claim 13, wherein the method further comprises forwarding the service request response to the mobile device.

16. The computer readable medium of claim 15 wherein the method further comprises formatting the customer service response into an SMS message.

* * * * *